2,946,797

N-AMINOTETRAHYDROISOQUINOLINIUM SALTS

Bernard Rudner, Pittsburgh, Pa., assignor to W. R. Grace & Co., New York, N.Y., a corporation of Connecticut No Drawing. Filed Aug. 18, 1958, Ser. No. 755,405

7 Claims. (Cl. 260—286)

This invention relates to organic compounds which contain a quaternized nitrogen as part of their structure. In one specific aspect, it relates to hydrazinium derivatives of tetrahydroisoquinoline which may be called N-aminotetrahydroisoquinolinium salts.

It is an object of the present invention to provide a new class of hydrazinium salts, useful for pharmaceutical and other purposes, which can be made in commercial quantities.

In accordance with the present invention, there has been discovered a new and useful generic class of hydrazinium compounds corresponding to the general formula:

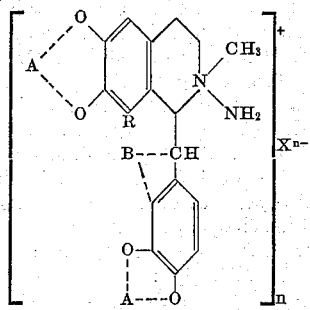

In the above formula R may be hydrogen or lower alkoxy. . . . A . . . represents a methylene group, two methyl groups or a hydrogen and a methyl group; the values of A are independently selected. When A is a methylene group a five-membered ring is formed. In the latter two situations, methyl and hydrogen are used to satisfy the valences of oxygen by forming hydroxy and methoxy groups. . . . B . . . represents a

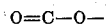

group, an aromatic carboxylic acid group and an aliphatic hydroxyl group, or two hydrogens. When B is

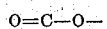

a five-membered lactone ring is formed corresponding to the hydroxy acid in which the carboxyl group is attached to the aromatic ring and the hydroxyl group is present on the methylene group connecting the aromatic ring with the tetrahydroisoquinoline structure. X is an anion bearing the charge $n$; $n$ also indicates the number of univalent cations required to balance the charge on X.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycolate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicilinate, camphorate, salicylamide, diphenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide).

Suitable starting amines for the practice of my invention include narcotine, gnoscopine, hydrastine, laudanine, laudanidine, laudanosine, codamine, bicucine and bicuculline. Related amines believed to react in a similar way are bebeerine, curine, berbamine, dauricine, armepavine, carnegine and hydrocotarnine. The starting amines are mostly naturally occurring alkaloids isolated from plants of genus Papaver and genus Hydrastis. The hydrazinium compounds synthesized from the above amines have minimum toxicity and exhibit strong hypotensive properties.

The scope and utility of my invention is further illustrated by the following examples:

Example I

A solution of 25 g. of narcotine in 200 ml. of chloroform was treated over a period of 90 minutes with gaseous chloramine formed in 60–70% yield from 22 g. of chlorine using the Sisler et al. generator previously discussed. After standing overnight, the reaction mixture was filtered from the resultant ammonium chloride and the filtrate evaporated to dryness. The 29 g. of light tan residue obtained was approximately a 50-50 mixture of unreacted narcotine and N-aminonarcotinium chloride. The product was isolated by dissolving the residue in acetone, filtering and pouring the filtrate into a five volume excess of ethyl acetate. Filtration gave about 10 g. of white powder melting at 230° C. and 97% pure by chloride titration; unreacted amine and more product were recovered by evaporation of the filtrate. Recrystallization of the product from acetone-ethyl acetate gave fine white needles melting at 230° C. soluble in water, alcohol and chloroform, somewhat in acetone and dimethylformamide and insoluble in benzene. Calculated for N-aminonarcotinium chloride ($C_{22}H_{25}N_2O_7Cl$): C, 56.8%; H, 5.43%; N, 6.03%; and Cl, 7.68%. Found: C, 57.0%; H, 5.68; N, 6.05%, and Cl, 8.17%.

Examples II and III

Separate portions of N-aminonarcotinium chloride were dissolved in water and treated with aqueous potassium hexafluorophosphate and with saturated aqueous picric acid. The resultant precipitates were collected by filtration and dried to give N-aminonarcotinium hexafluorophosphate (M.P. 167–168° C.) and N-aminonarcotinium picrate (M.P. 126–127° C.) respectively. The structural formula of the latter is shown below:

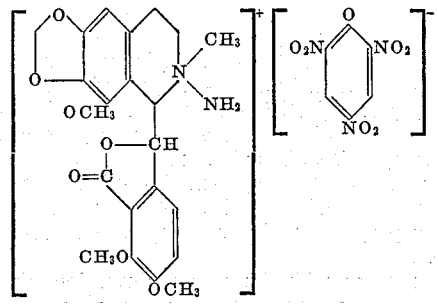

Example IV

A solution of 0.22 g. of N-aminonarcotinium chloride in 10 ml. of deionized and deaerated water was treated with an equivalent amount of sodium hydroxide as a 0.1 N solution in deaerated water. The reaction mixture at 40–50° C. was evaporated to dryness in a stream of nitrogen; the evaporation was repeated after 20 ml. more treated water was added. The residual thick yellow oil, soluble in water and alcohol, was believed to be the sodium salt of the hydrolyzed lactone. Heating with anhydrous hydrogen chloride first converted it to the hydroxy acid and then to the lactone identical with the product of Example I as illustrated below:

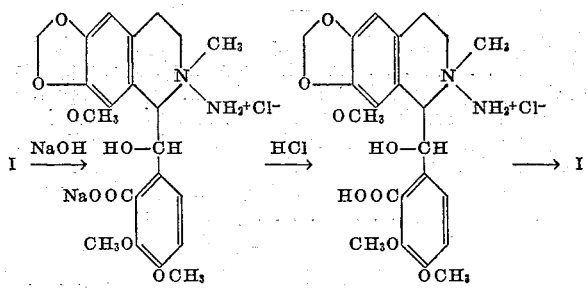

Example V

An equimolar solution of N-aminonarcotinium chloride and the potassium salt of penicillin G in alcohol was refluxed for 4 hours and then concentrated by evaporation. After cooling overnight, the reaction mixture was filtered from the resultant potassium chloride and the filtrate evaporated to dryness. The residual crude brown oil was taken up in absolute alcohol and poured into a three volume excess of peroxide-free anhydrous dioxane. Filtration and repeated washing with dioxane gave the N-aminonarcotinium penicillin G salt as a fine off-white powder which melted indefinitely around 163° C. and was not readily soluble in cold water.

Example VI

A solution of 25 g. of hydrastine dissolved in chloroform was treated with gaseous chloramine as in Example I. The reaction mixture was filtered from ammonium chloride and evaporated to a water and chloroform soluble yellow product. Purification was effected by redissolving the residue in chloroform and adding the solution to a ten volume excess of benzene. Filtration gave N- aminohydrastinium chloride as a yellow powder melting 179–180° C.; its structural formula is given below:

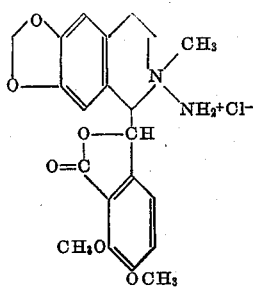

Examples VII and VIII

Separate portions of N-aminohydrastinium chloride were dissolved in water and treated with aqueous potassium hexafluorophosphate and with saturated aqueous picric acid. The resultant precipitates were collected by filtration and dried to give N-aminohydrastinium hexafluorophosphate (M.P. 290° C.) and N-aminohydrastinium picrate (M.P. ca. 125° C.) respectively.

Examples IX and X

N-aminonarcotinium chloride was dissolved in physiological saline at concentrations of 10 and 50 mg./ml. and administered to unstarved male albino mice at doses of 50, 300, 400 and 500 mg./kg. The acute intraperitoneal $LD_{50}$ at 48 hours appeared to be approximately 400 mg./kg.

A mongrel female dog weighing 8.8 kg. was anesthetized by the intraperitoneal administration of phenobarbital sodium and surgery was supported with intravenous pentobarbital sodium. The carotid artery was cannulated and connected to a mercury manometer for recording blood pressure and a Pfeiffer Cannula was inserted into the trachea and connected to a Marey tambour for recording respiration. A femoral vein was exposed for introduction of the test material. N-aminonarcotinium chloride was dissolved in physiological saline at concentrations of 2.0 and 20 mg./ml. The dog received intravenous doses of 0.05, 0.25, 1.25, 6.25 and 11 mg./kg. over a period of approximately four hours. A moderate but transient fall in blood pressure was observed following the 1.25 mg./kg. dose. Marked and precipitous falls in blood pressure with apnea were observed after doses of 6.25 and 11 mg./kg., the duration of the hypotensive action was from 30 to 60 minutes. There were no significant effects on the blood pressure responses to acetylcholine, epinephrine or nor-epinephrine at any time during the study. The pressor response to nicotine was abolished following 1.25 mg./kg. dose, suggesting ganglionic depressant activity.

I claim:
1. New chemical compounds having the general formula:

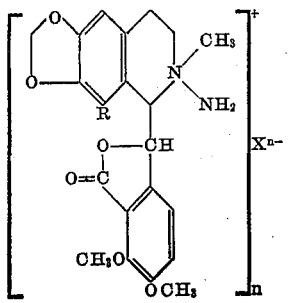

wherein R is lower alkoxy, X is a pharmaceutically acceptable anion and $n$ is an integer less than four.

2. New chemical compounds having the general formula:

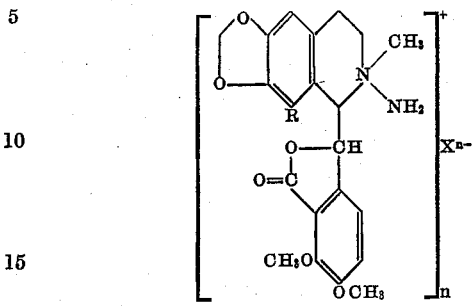

wherein R is hydrogen, X is a pharmaceutically acceptable anion and $n$ is an integer less than four.

3. New chemical compounds having the general formula:

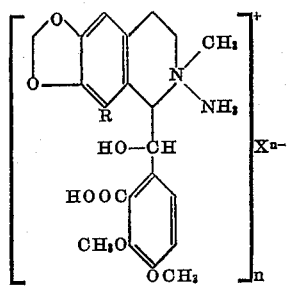

wherein R is lower alkoxy, X is a pharmaceutically acceptable anion and $n$ is an integer less than four.

4. As a new chemical compound, N-aminonarcotinium chloride.

5. As a new chemical compound, N-aminonarcotinium picrate.

6. As a new chemical compound, N-aminohydrastinium chloride.

7. New chemical compounds having the general formula:

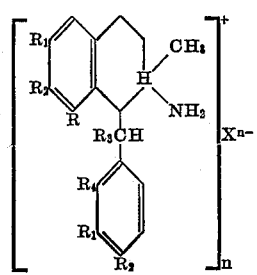

wherein R is selected from the group consisting of hydrogen and lower alkoxy; $R_1$ and $R_2$ taken individually are selected from the group consisting of hydroxy and methoxy; $R_1$ and $R_2$ taken collectively are methylenedioxy; $R_3$ is selected from the group consisting of hydrogen and hydroxyl; $R_4$ is selected from the group consisting of hydrogen and carboxyl; $R_3$ and $R_4$ taken collectively are carbonyloxy; X is a pharmaceutically acceptable anion; and $n$ is an integer less than four.

No references cited.

UNITED STATES PATENT OFFICE
Certificate of Correction

Patent No. 2,946,797                                July 26, 1960

Bernard Rudner

It is hereby certified that error appears in the above numbered patent requiring correction and that the said Letters Patent should read as corrected below.

Column 6, lines 45 to 55, the formula should appear as shown below instead of as in the patent:

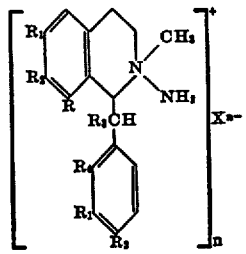

Signed and sealed this 9th day of May 1961.

[SEAL]

Attest:
ERNEST W. SWIDER,
*Attesting Officer.*

DAVID L. LADD,
*Commissioner of Patents.*